UNITED STATES PATENT OFFICE.

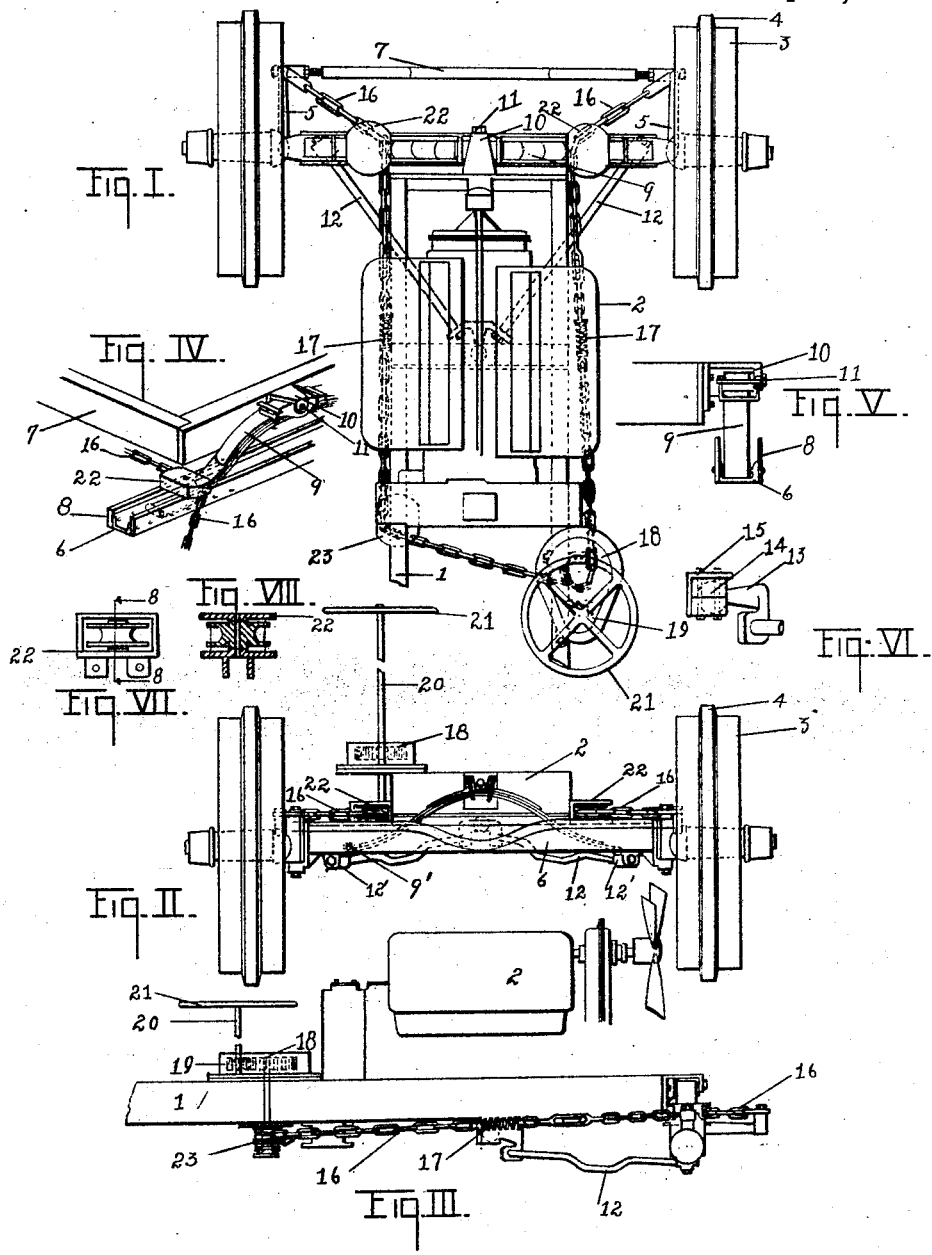

EDMUND E. HANS, OF KALAMAZOO, MICHIGAN.

STEERING GEAR AND FRONT AXLE.

1,411,494.  Specification of Letters Patent.  Patented Apr. 4, 1922.

Application filed March 6, 1918. Serial No. 220,828.

*To all whom it may concern:*

Be it known that I, EDMUND E. HANS, a citizen of the United States, residing at Kalamazoo, Michigan, have invented certain new and useful Improvements in Steering Gears and Front Axles, of which the following is a specification.

This invention relates to the front gear construction and steering means for a truck or tractor, the same being here shown especially adapted for tractor use.

The objects of the invention are:

First, to provide a structure of very great strength and compactness.

Second, to provide a structure which is exceedingly flexible in its movements.

Further objects and objects relating to details and to economies of construction and operation will definitely appear from the detailed description to follow.

I accomplish the objects of my invention by the devices and means described in the following specification. The invention is clearly defined and pointed out in the appended claims.

A structure which is a preferred embodiment of my invention is fully illustrated in the accompanying drawing forming a part of this specification, in which:

Fig. I is a plan view of the front portion of a truck and steering mechanism, certain portions not involved in my invention being omitted to insure clearness, and the general relation of the parts being indicated more or less diagrammatically.

Fig. II is a front view of the structure appearing in Fig. I with the power plant omitted.

Fig. III is a side elevation view of the structure appearing in Fig. I with the front wheels omitted and the general relation of the parts disclosed, the power plant being disclosed conventionally.

Fig. IV is a detail perspective view, with parts indicated in dotted lines, showing the construction and arrangement of the forward spring and its relation to the forward axle.

Fig. V is a detail side elevation view of the parts appearing in Fig. IV, the steering chain and guide being omitted.

Fig. VI is an enlarged detail view of the central universal joint for providing the flexible connection for the braces for the front axle.

Figs. VII and VIII are detail views of the guide pulleys for the chain and the steering mechanism.

In the drawings, similar numerals of reference refer to similar parts throughout the several views.

Considering the numbered parts of the drawing, the frame 1 is of the usual construction or any appropriate construction. The power plant 2 is preferably of the usual internal combustion engine type, which I have illustrated conventionally, as my invention does not pertain to the engine or the suspension of it.

3 is a broad brimmed wheel with a central cushion tire 4 projecting around the periphery of the same to afford a sure engagement of the ground or pavement and to facilitate the proper steering of the truck.

5 are the usual steering knuckles pivoted at the opposite ends of the front axle 6, the steering knuckles being connected by the cross bar 7. The axle 6 is of U-form in cross section, being made of a piece of channel bar with side plates secured thereto, as appears in detail in Figs. IV and V.

Disposed within this inverted U-shaped axle is the front spring 9, which is a semi-elliptic blade spring, the ends of which rest in the channel seat, thus providing for the same in the top of the axle. A pin 9' secures one end of the spring in place.

A bracket 10 is provided on the front of the frame and is pivotally connected by the forwardly disposed horizontal pivot bolt 11 to the spring so that the front axle can tip toward either side without putting strain upon the frame, the frame thus being of three-point suspension.

The axle is braced in its position to the frame by a pair of oblique braces 12, secured to lugs 12' on the under side of the front axle and at their rear ends they are connected to joint member 13 which has a ball joint 14 secured in socket members 15 that are secured to the under side of a cross bar on the frame toward the forward end of the said frame 1.

Steering chains 16 are secured to the opposite knuckles 5, 5 and are disposed over suitable guiding pulleys 22, 22 and 23 and wrap around a suitable drum which is controlled by the gear 18 meshing with the small pinion 19 which is controlled by the steering column 20 and steering wheel 21.

In each chain 16 a compensating spring 17 is disposed of such strength as to insure the turning of the wheels and at the same time compensate for the variations in length of the chain due to the steering movement. I have not shown the seat for the driver or any of these parts, all of which will be of the usual construction.

I desire to state that the structure can be considerably varied. I prefer to provide the broad wheel 3 with a central cushion tire 4, although this tire for mere engagement purposes might be of wood or metal.

My improved axle, while it lends itself particularly to the arrangement here shown, would be of advantage in most any style of truck, and I desire a specific claim to the front axle and its spring as disposed here aside from its combination relation with the other parts.

Having thus described my invention, what I claim as new and desire to secure by Letters Patent is:

1. In a truck or tractor the combination of a main frame, carrying wheels and front axle therefor of channel shape, a semi-elliptical blade spring, the ends of which rest in the said channel, a pivotal connection for the upper central portion of the spring to the front of the frame, braces from the said axle to a ball and socket joint on the under side of said frame, steering knuckles for the said wheels with connections between the same, a steering chain disposed and connected to the said steering knuckles and disposed about guide pulleys and controlled by a suitable steering column and wheel, and compensating springs in the said chain, all coacting substantially as described for the purpose specified.

2. In a truck or tractor the combination of a main frame, carrying wheels and a front axle therefor of channel shape, a semi-elliptical blade spring, the ends of which rest in the said channel, a pivotal connection for the upper central portion of the spring to the front of the frame, braces from the said axle to a ball and socket joint on the under side of said frame, and steering means for said wheels, all coacting substantially as described for the purpose specified.

3. In a truck or tractor, the combination of a main frame, carrying wheels and a front axle therefor of channel shape, a spring structure disposed in said channel, a pivotal connection for the upper central portion of the spring to the front of the frame, braces from the said axle to a ball and socket joint on the under side of said frame, and steering means for said wheels, coacting substantially as described for the purpose specified.

4. In a truck or tractor, the combination of a main frame, a front axle with steering knuckles with forwardly projecting arms, flexible connection from the axle to the frame, chain connections to the steering knuckles disposed beneath the frame, centrally disposed guiding means on said axle for said chain, and compensating springs in the said chains.

5. In a truck or tractor, the combination of a main frame, a front axle with steering knuckles with forwardly projecting arms, flexible connection from the axle to the frame, and chain connections to the steering knuckles disposed beneath the frame, and centrally disposed guiding means on said axle for said chain.

6. In a truck or tractor, the combination of the main frame, a front axle of U-shaped channel, and a semi-elliptical leaf spring disposed with its ends down within the channel and the central bowed part up, and pivotal connection between the said frame and the central part of said spring, as specified.

In witness whereof, I have hereunto set my hand and seal in the presence of two witnesses.

EDMUND E. HANS. [L. S.]

Witnesses:
LUELLA G. GREENFIELD,
MARGARET L. GLASGOW.